United States Patent [19]

Yasuda et al.

[11] Patent Number: 4,962,379

[45] Date of Patent: Oct. 9, 1990

[54] ARBITER CIRCUIT FOR PROCESSING CONCURRENT REQUESTS FOR ACCESS TO SHARED RESOURCES

[75] Inventors: Kenichi Yasuda; Toshifumi Kobayashi; Michihiro Yamada, all of Hyogo, Japan

[73] Assignee: Mitsubishi Denki Kabushiki Kaisha, Tokyo, Japan

[21] Appl. No.: 286,921

[22] Filed: Nov. 18, 1988

[30] Foreign Application Priority Data

Nov. 19, 1987 [JP] Japan .................... 62-292831

[51] Int. Cl.$^5$ ............................... H04Q 1/20
[52] U.S. Cl. ........................... 340/825.510; 370/85.2; 340/825.5; 364/242.6; 364/242.7; 364/242.92
[58] Field of Search .......... 340/825.5, 825.51, 825.05; 307/269, 408, 518; 364/242.6, 242.7, 242.92, 924.7, 924.8, 946.92; 370/85.6, 85.1, 85.2, 85.3

[56] References Cited

U.S. PATENT DOCUMENTS

| | | | |
|---|---|---|---|
| 3,824,409 | 7/1984 | Patil .................................. | 340/825.5 |
| 4,249,093 | 2/1981 | Henig ................................ | 340/825.5 |
| 4,314,164 | 2/1982 | Tin et al. .......................... | 340/825.5 |
| 4,339,808 | 7/1982 | North ................................ | 340/825.5 |
| 4,423,384 | 12/1983 | DeBock ........................... | 340/825.51 |
| 4,612,542 | 8/1986 | Pantry et al. ..................... | 340/825.5 |
| 4,815,039 | 3/1989 | Tai et al. .......................... | 307/269 |

FOREIGN PATENT DOCUMENTS 0185370  6/1986  European Pat. Off. ......... 340/825.5

OTHER PUBLICATIONS

Davies, Mike, "An M Inexpensive Asynchronous Priority System", 11/24/81, Design Focus, New Electronics, vol. 14, No. 23, p. 23.

T. Sakurai et al., "A 36ns 1Mbit Pseudo SRAM with VSRAM Mode" 1987 Symposium on VLSI Circuits, Digest of Technical Papers, IEEE Cat. No. 87, TH 0190-9, May 22,23, 1987.

Primary Examiner—Donald J. Yusko
Assistant Examiner—Eric Oliver Pudpud
Attorney, Agent, or Firm—Lowe, Price, LeBlanc, Becker & Shur

[57] ABSTRACT

An arbiter circuit is disclosed for processing requests made at least two subsystems in a multiprocessor system for access to a resource shared by the subsystems. The arbiter circuit includes an SR flip-flop composed of a pair of NAND gates. The flip-flop is operative in response to a time-staggered request signals from the subsystems to provide a request acknowledging signal to the shared resource. When two request signals are simultaneously supplied to the arbiter circuit, the outputs from the pair of NAND gates tend to stay at an intermediate level between the normal two distinctive logic levels, failing to produce an acknowledgment signal. However, the intermediate level of the NAND gate outputs is sensed by a NOR gate to a trigger a switching device into conduction, by means of which one of the intermediate NAND gate outputs is positively shifted to either of the active logic levels for the generation of an acknowledgement signal to the shared resources. Thus, one of the two subsystems is allowed access to the shared resource.

5 Claims, 6 Drawing Sheets

ARBITER CIRCUIT FOR PROCESSING CONCURRENT REQUESTS FOR ACCESS TO SHARED RESOURCES

BACKGROUND OF THE INVENTION

1. Field of the Invention

This invention generally relates to an arbiter circuit, and in particular to arbiter circuit for processing concurrent requests made at random in time by a plurality of digital subsystems for the use of shared resources.

2. Description of the Prior Art

In a multiple system such a multiprocessor system, a plurality of subsystems, for example, central processing units which operate independently of one another, share some resources such as a disc storage device. In such systems demands for the use of the shared resources are made at random in time, often concurrently, by the sharing subsystems, making it necessary to process those concurrent requests. For example, one subsystem may make a request for the permission to use the shared resource when it is currently being accessed by another subsystem. In this situation, the late-to-come demand must be temporarily suspended until the current subsystem has completed its use of the shared resource. The arbiter circuit is one typical device for processing the coexisting demands, and is disclosed, for example, in an article by T. Sakurai et al entitled, "A 36 ns 1 Mbit Pseudo SRAM with VSRAM Mode." (Digest of Technical Papers for the 1987 Symposium on VLSI Circuits, May 22, 1987, pp. 45).

Figure 1:
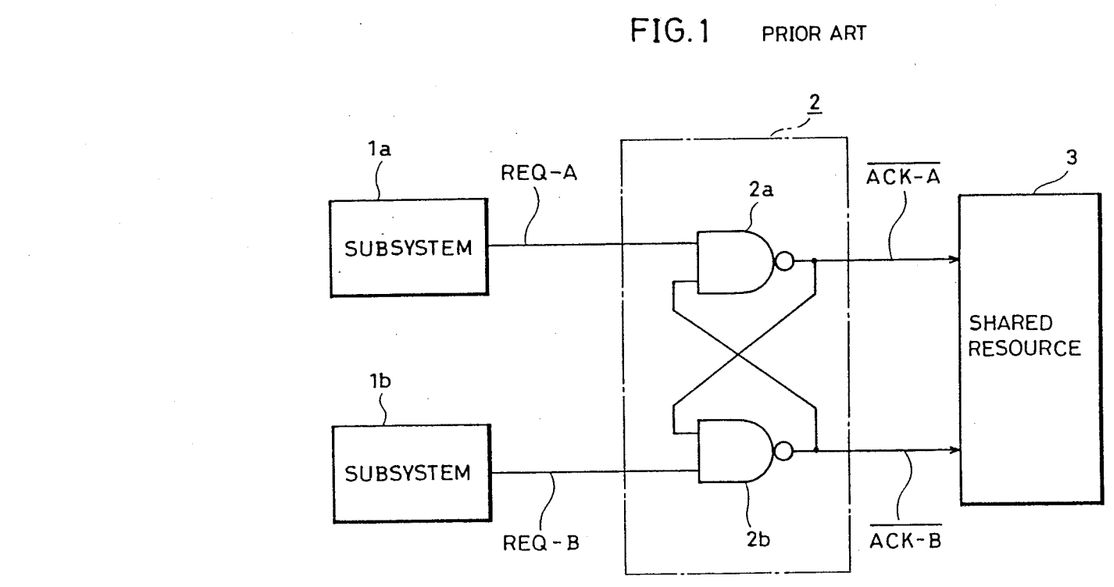
FIG. 1 is a block diagram showing a general arrangement of a prior-art arbiter circuit.

In order to have a brief background understanding of the invention, reference is made to FIG. 1 which illustrates in block diagram a prior-art arbiter circuit. Digital subsystems 1a and 1b in a multiprocessors system operate independently of each other with no operative interrelations, and hence generate at random in time request signals REQ-A and REQ-B for demanding the use of a shared resource 3 in the form of a disc storage device. The request signals REQ-A and REQ-B are supplied to an arbiter circuit 2, which in turn provides an acknowledgement signal $\overline{ACK}/$ or another acknowledgement signal $\overline{ACK}/$ to share resource 3, the $\overline{ACK}/$ signal indicating the request by the REQ-A signal has been acknowledged, whereas the $\overline{ACK}/$ signal representing the request by the REQ-B signal has been granted.

To state in more detail, the arbiter circuit 2 includes a first NAND gate 2a which is supplied with the REQ-A signal and $\overline{ACK}/$ signal, and produces the $\overline{ACK}/$ signal. Also included in the arbiter circuit 2 is a second NAND gate 2b which is supplied with the REQ-B signal and the $\overline{ACK}/$ signal, and operates to generate the $\overline{ACK}/$ signal. In essence, the arbiter circuit 2 is an SR flip-flop composed of the first and second NAND gates 2a and 2b.

Figure 2:
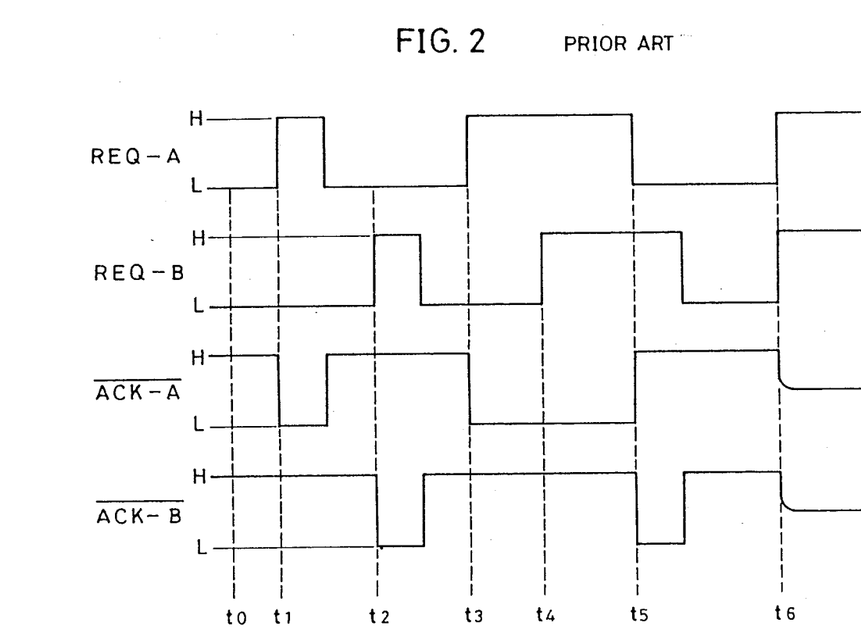
FIG. 2 is a diagram showing a series of waveforms that appear at various points in the arbiter circuit of FIG. 1.

Now, the operation of the arbiter circuit of FIG. 1 is described with reference to FIG. 2 which shows a series of waveforms as they appear at various points in the circuit.

Under an operating situation where both the subsystem 1a and the subsystem 1b are silent on the demand for access to the shared resource with the request signals REQ-A and REQ-B being at "L" level, one input of the first NAND gate 2a to be supplied with the REQ-A signal is kept at the "L" level, and the output signal $\overline{ACK}/$ of the same NAND gate takes on a high or "H" level regardless of the signal level or state assumed by the $\overline{ACK}/$ signal at the output of the second NAND gate 2b, and thus at the other input of the first NAND gate 2a. With the REQ-B signal at one input of the second NAND gate 2b also being at the "L" level, the $\overline{ACK}/$ signal at the output of the second NAND gate 2b is at the "H" level regardless of the level which the $\overline{ACK}/$ signal at the other of the second NAND gate takes. The request acknowledgement signals $\overline{ACK}/$ and $\overline{ACK}/$ are of low-level acting, the presence of the high-level acknowledgement signals $\overline{ACK}/$ and $\overline{ACK}/$ at time $t_0$ in FIG. 2 indicates that the arbiter circuit 2 fails to acknowledge any request for the use of the shared resource by the REQ-A and REQ-B signals.

At time $t_1$ when the subsystem 1a presents the request for the permission to use the shared resource 3 while the other subsystem 1b is silent on a similar request, one request signal REQ-A shifts to the high logic level or state, whereas the other request signal REQ-B remains at the low logic level. Under the conditions, the both inputs of the first NAND gate 2a are applied with high-levels signals, causing the NAND gate 2a to generate a low-level acknowledgement signal $\overline{ACK}/$ at its output. This indicates that the request made by the signal REQ-A has been granted. Meanwhile, with a low-level REQ-B signal being applied to its one input, the second NAND gate 2b provides a high-level $\overline{ACK}/$ signal at its output, indicating that no request is acknowledged by the second NAND gate 2b. When the subsystem 1a has been through with the use of the shared resource, the request signal REQ-A falls back to its low logic level, followed instantly by the $\overline{ACK}/$ signal returning to its high logic level.

Further, at time $t_2$ when the subsystem 1b makes a request for the permission to use the shared resource 3 with the other subsystem 1a silent on such request, the request signal REQ-B for the subsystem 1b changes from the low logic level to the high logic level, while the request signal REQ-A for the subsystem 1a stays at the low logic level. Under the above conditions, the second NAND gate 2b has high-level signals applied to its both inputs, and thus produces a low-level $\overline{ACK}/$ signal at the output, indicating that the request by the REQ-B signal has been acknowledged. On the other hand, the first NAND gate 2a, with the low-level REQ-A signal being supplied at one input, generates a high-level $\overline{ACK}/$ signal at the output, representing the absence of a request from the subsystem 1a. Upon the completion of the use of the shared resource by the subsystem 1b, the request signal REQ-B shifts back to the low logic level accompanied by the $\overline{ACK}/$ signal returning to the high logic level or state.

Now to consider a situation where two requests are made in a time-staggered manner. At time $t_3$, the subsystem 1a produces a high-level request signal REQ-A asking for access to the shared resource 3, upon the receipt of which the first NAND gate 2a provides a low-level $\overline{ACK}/$ signal to grant the request. Subsequent to the first request by the subsystem 1a, the other subsystem 1b issues a second request for the use of the same shared resource 3 by providing a high-level REQ-B signal to the one input of the second NAND gate 2b at time $t_4$. It is noted that, at this point, the second NAND gate 2b is being supplied at the other input with the low-level $\overline{ACK}/$ signal from the output of the first NAND gate 2a. Thus, the application of the second high-level request signal REQ-B to the second NAND gate 2b does in no way affect the $\overline{ACK}/$ signal currently in its high logic state at the output of the second NAND gate. With the $\overline{ACK/}$ signal at the high logic level, the second NAND gate 2b does not accept the second request made by the subsystem 1b.

When the subsystem 1a vacates the shared resource 3 at time $t_5$, the request signal REQ-A shifts down to the low logic level, causing the $\overline{ACK/}$ signal at the output of the first NAND gate 2a to return to the high logic level. The request by the subsystem 1a is thus negated. The other request made by the subsystem 1b still valid with the high level REQ-B signal applied to the one input of the second NAND gate, the emergence of the high-level $\overline{ACK/}$ signal at the output of the first NAND gate 2a applies another high-level signal to the other input of the second NAND gate 2b. As a result, the $\overline{ACK/}$ signal at the output of the second NAND gate shifts to the low logic level to put the request by the signal REQ-B into effect. When this request by the subsystem 1b is brought to an end, the $\overline{ACK/}$ signal again moves back to the high logic level as before.

In short, if the subsystem 1a and 1b make individual requests for access to the shared resource 3 at different points of time, the arbiter circuit 2 functions to accept the earlier request into effect, while suspending the later request until the earlier one has been fully implemented.

However, the prior-art arbiter circuit of FIG. 1 is incapable of coping with two concurrent requests made by both subsystem 1a and 1b at a time. Now to consider a case where the request signals REQ-A and REQ-B are simultaneously shifted from the low level to the high level at time $t_6$, just prior to this time when both signals REQ-A and REQ-B are at the low levels, the acknowledgement signals $\overline{ACK/}$ and $\overline{ACK/}$ are in their high logic state. Under the circumstances, the simultaneous shifting of the REQ-A and REQ-B signals into the high logic states drives the $\overline{ACK/}$ output of the first NAND gate 2a into the low level on one hand since the first NAND gate has been supplied with the high level $\overline{ACK/}$ signal at the one input. It also drives the $\overline{ACK/}$ output signal of the second NAND gate 2b toward the low logic level because the second NAND gate has been supplied with the high-level $\overline{ACK/}$ signal at the one input. The arbiter circuit 2 essentially an SRJ flip-flop, the simultaneous application of the high level signals REQ-A and REQ-B to arbiter circuit leads to the generation of the $\overline{ACK/}$ and $\overline{ACK/}$ 0 output signals with the opposite logic levels. Consequently, the $\overline{ACK/}$ and $\overline{ACK/}$ signals which are shifting from the high level to the low level counteract with each other into driving the other signal toward the high level. The overall result is that both the $\overline{ACK/}$ signal and the $\overline{ACK/}$ signal are forced to "stay afloat" midway between the high and low logic levels. With the acknowledgement signals midway the prescribed logic levels or states, there are good changes that the arbiter circuit is unable to process the concurrent demands and neither of the requesting subsystems are denied access to the shared resource. This in turn may contribute to an undesirable consequence of faulty operation in the multiprocessing system.

SUMMARY OF THE INVENTION

It is, therefore, an object of the invention to provide an aribter circuit capable of effectively processing a plurality of competing requests for access to a shared resource.

It is another object of the invention to provide an improved arbiter circuit capable of selecting and granting one of a plurality of requests made simultaneously for access to a shared resource.

Briefly stated, an arbiter circuit according to the present invention includes an SR flip-flop which is adapted to be supplied with first and second request signals asking for access to a shared resource. The first and second request signals take on two different logic levels or states with one logic level or state representing a request for access to the shared resource being made, and the other logic level or state representing the absence of such request. The SR flip-flop functions to provide two output signals in one logic level or the other depending on the presence and absence of the externally supplied request signals. The arbiter circuit also includes a sense unit for sensing that the two output from the SR flip-flop have reached a midway level between the first and second logic levels as a result of the simultaneous application of the first and second request signals to the flip-flop, in response to which a driver unit operates to positively shift either one of the two outputs to the first or second logic level. A delay unit in the arbiter circuit transfers the two inputs from the SR flip-flop as first and second request acknowledgement signals with a predetermined time delay.

With the novel arrangement of the arbiter circuit in accordance with this invention, when the both outputs of SR flip-flop in the circuit have reached the intermediate level between the first and second logic levels due to the concurrent application of the first and second request signals to the flip-flop, the arbiter circuit functions to positively shift one output to one of the logic levels in order to acknowledge either of the two competing requests for access to the shared resource. In this manner, a plurality of requests for the use of the shared resource is effectively processed into selecting one of them, thus averting an undesirable as well as uneconomical result that all of the requests are denied with the shared resource left unaccessed.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 3:
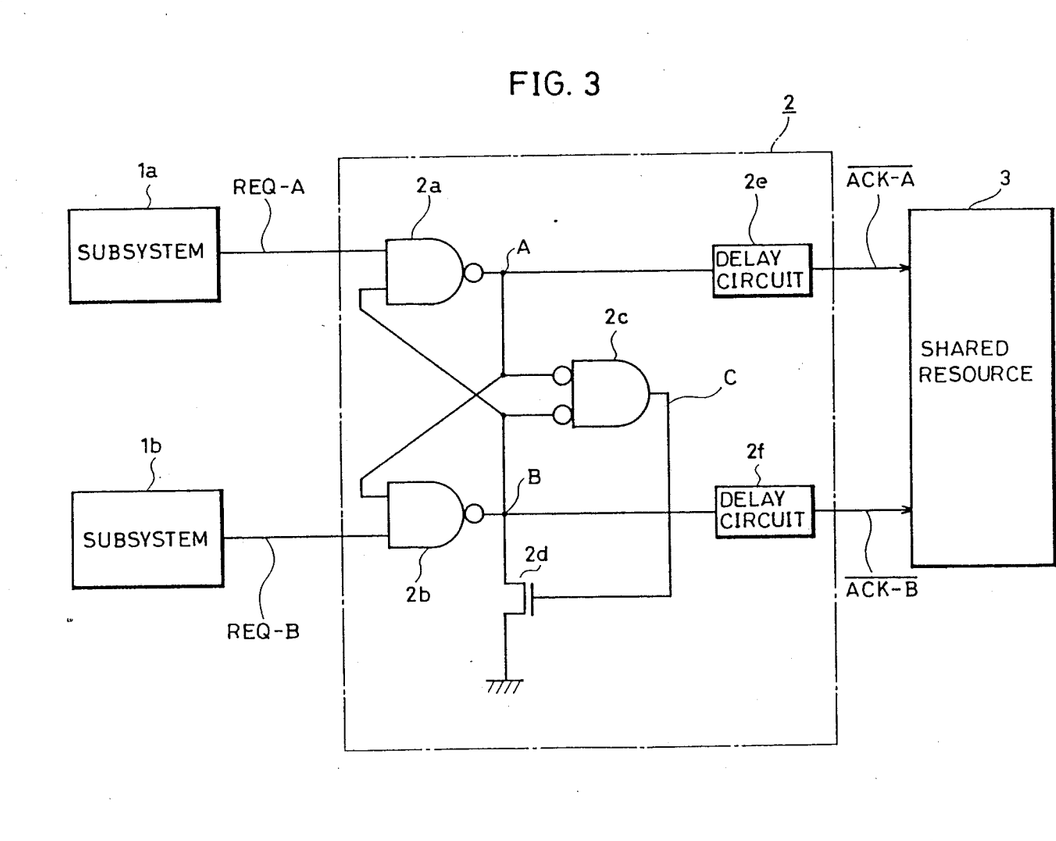
FIG. 3 is a block diagram showing a general arrangement of an arbiter circuit according to one preferred embodiment of the invention.

Reference is first made to FIG. 3 which illustrates in block diagram the general configuration of an arbiter circuit according to one preferred embodiment of the invention. The arbiter circuit of the present invention is basically identical in construction to the prior-art circuit shown in FIG. 1 except for several component parts added thereto. These additional parts involve: a NOR gate 2c whose two inputs are coupled to receive the output signals from the first and second NAND gates 2a and 2b; a semiconductor or a transistor switching device 2d connected between the output of the second NAND gate 2b and ground with its control electrode coupled to the output of the NOR gates 2c; and delay circuits 2e and 2f connected to the NAND gates 2a and 2b for the purpose of delaying the shifting of the output signals from the high logic level to the low logic level.

Figure 4:
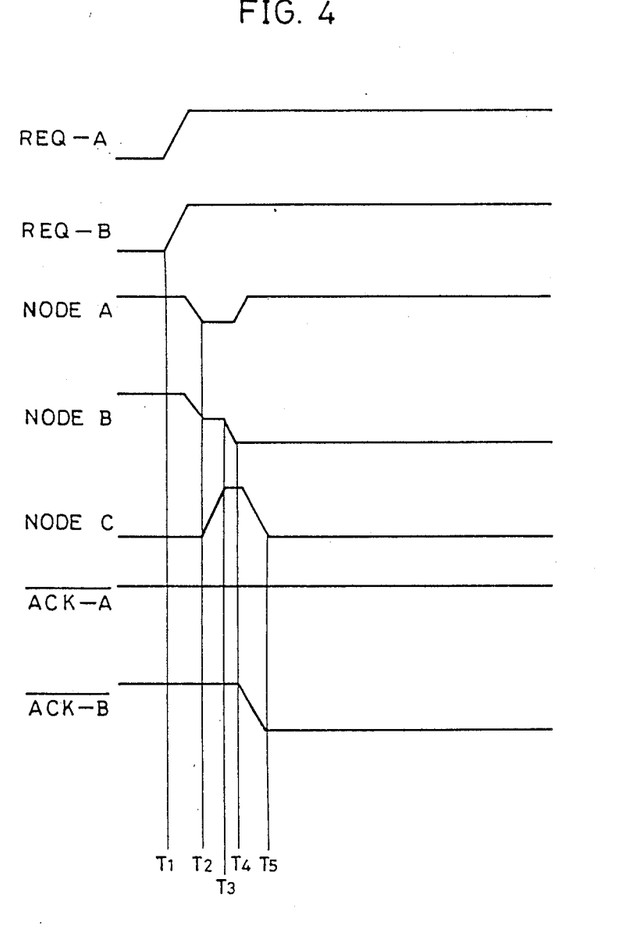
FIG. 4 is a diagram showing a series of waveforms that appear at various points in the circuit of FIG. 3.

Having also reference to a series of waveforms in FIG. 4, the operation of the arbiter circuit is now described.

In a situation where both subsystems 1a and 1b make request for access to the shared resource 3 by generating the request signals REQ-A and REQ-B in time-staggered fashion, at least either of the outputs of the NAND gates 2a and 2b is at the high logic level as stated in connection with the conventional arbiter circuit, and the NOR gate 2c fails to produce the output signal for turning on the switching device 2d. With switching device 2d non-conducting, the arbiter circuit 2 operates much the same way as in the conventional circuit and, thus, accepts the earlier request into effect, keeping the later request pending.

In a crucial situation where the subsystem 1a and 1b make their individual requests for the use of the shafed resource 3 simultaneously at time $T_1$, the request signals REQ-A and REQ-B are both shifted from the low logic levels to the high logic levels. Prior to this shift-up, the low level REQ-A and REQ-B signals kept the acknowledgement signals $\overline{ACK}/$ and $\overline{ACK}/$ at the high levels. As the REQ-A and REQ-B signals change to the high logic levels, the first NAND gate 2a is supplied with the high-level signals at both inputs with the result that output or the potential at node A starts shifting down to the low level. The second NAND gate is also supplied with the high level signals at the two inputs, causing the potential at node B to be brought to the low level. However, as stated previously, due to the fact that the NAND gates 2a and 2b form an SR flip-flop, the dropping potential at nodes A and B counteract with each other so that they are kept floating at an intermediate potential level between the low and high levels. It is pointed out at this point that if the NOR gate 2c is set to have a threshold potential slightly above the intermediate potential level for the nodes A and B, the potential at node C starts shifting to the high level once the potentials at nodes A and B reach the intermediate level at time of $T_2$ through the function of the NOR gate 2c. As the potential on the node C is brought to the high level at time $T_3$, the switching device 2d turns on to couple the node B to ground. With the potential on the node B at ground level at time $T_4$, the output of the first NAND gate 2a i.e. the potential on node A shifts to the high level, causing the output of the NOR gate 2c, thus the potential on node C to be brought down to the low level at time $T_5$. The downward shift of the output signals from the NAND gates 2a and 2b are delayed for respective predetermined periods by means of the delay circuits 2e and 2f. It should be noted that the delay circuit 2e has a delay time corresponding at least to the period of time during which the potential on node A shifts from the high level down to the low level and up again back to the low level, while the other delay circuit 2f has a delay time corresponding at least to the time it takes for the potential on node B to shift from the high level down to the low level. The delay provided by the time delay circuit 2e effectively absorbs the length of time through which the potential on node A shift up and down. Accordingly, the variation of the potential at node A has effect not on the $\overline{ACK}/$ signal but on the $\overline{ACK}/$ signal, which is driven down to the low level to accept the request by the REQ-B signal.

With the circuit arrangement of FIG. 3, the NOR gate 2c functions to sense that the potentials on nodes A, and B have reached the midway level, and positively drives the potential on node B down to low level through turning on the switching device 2d thereby to grant the request made with the REQ-B signal. In this manner, the arbiter circuit 2 of the invention effectively selects one of the two coexisting and incompatible demands for access to the shared resource.

Figure 5:
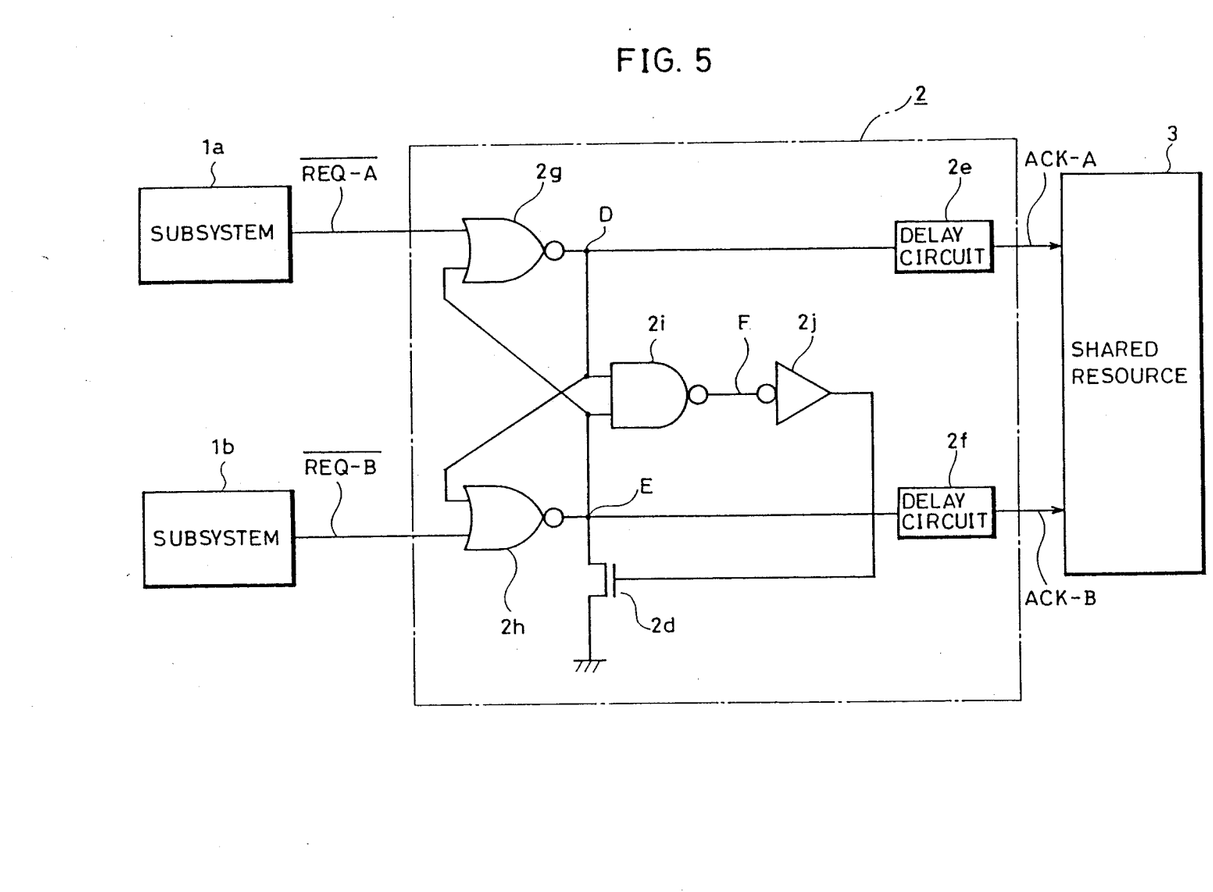
FIG. 5 is a block diagram showing a general arrangement of an arbiter circuit according to another preferred embodiment of the invention.

Referring to FIG. 5, there is illustrated an arbiter circuit according to another preferred embodiment of the invention. The arbiter circuit of FIG. 5 is substantially identical in construction to the one shown in FIG. 3 except that a pair of two-input NOR gates 2g and 2h form a SR flip-flop. Subsystems 1a and 1b ask for permission to use the shared resource 3 by providing low-level request signals $\overline{REQ}/$ and $\overline{REQ}/$. Upon receiving the low-level request signals, the arbiter circuit 2 operates to feed high-level acknowledgement signals ACK-A and ACK-B to accept the request. More specifically, the first NOR gate 2g functions to provide an output on node D when supplied with the $\overline{REQ}/$ signal and the output signal from the second NOR gate 2h, whereas the second NOR gate 2h provides an output signal to node E when supplied with the $\overline{REQ}/$ signal and the output signal from the first NOR gate 2g. The output signals from the NOR gates 2g and 2h are also fed to the NAND gate 2i, the output signal of which is then applied to the control electrode of the switching device 2d after being inverted by the inverter 2j.

In the illustrated embodiment, when the subsystem 1a presents a request for access to the shared resource 3, the request signal $\overline{REQ}/$ shifters to the low logic level with the other request signal $\overline{REQ}/$ remaining at the high logic level. The application of the low-level signal $\overline{REQ}/$ to the NOR gate 2g triggers to the NOR gate into producing a high-level ACK-A signal, while the signal ACK-B at the output of the second NOR gate 2h stays at the normal low level. THis indicates the request made with $\overline{REQ}/$ signal has been acknowledged. On the other hand, when the subsystem 1b makes a request for access to the shared resource, the signal $\overline{REQ}/$ is brought down to the low level with the other signal $\overline{REQ}/$ at the normal high level. The low-level request signal $\overline{REQ}/$ triggers the NOR gate 2h into providing a high-level ACK-B signal for the acceptance of the request made by the subsystem 1b. When both subsystems 1a and 1b make individual requests at the same time, the request signals $\overline{REQ}/$ and $\overline{REQ}/$ are simultaneously shifted into the low level, causing the NOR gates 2g and 2h to generate the high-level output signals which counteract with each other. The counteracting signals settle the potentials on nodes D and E to a value midway between the low and high levels. With its threshold voltage set slightly below the midway potential, the NAND gate 2i operates to sense the intermediate potential levels on nodes D and E and generates a low-level output signal, which is then inverted into a high-level signal by the inverter 2j. The inverted high-level signal turns on the switching device 2d to couple node E to ground potential. Consequently, only the ACK-A signal is allowed into the high-level condition to acknowledge the request made with the $\overline{REQ}/$ signal. Concurrent requests are effectively processed in this manner for the selection of one of them.

Figure 6:
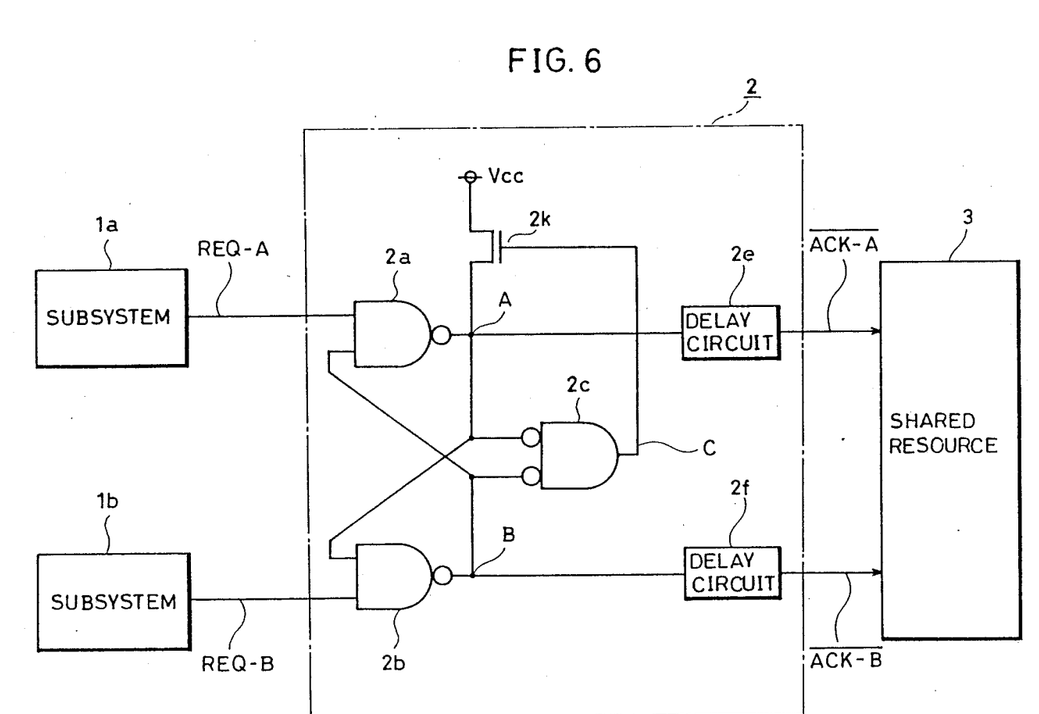
FIG. 6 is a block diagram showing a general arrangement of an arbiter circuit according to another preferred embodiment of the invention.

In the embodiments of FIGS. 3 and 5, the circuit is so designed that one of the output nodes in the flip-flop at the intermediate potential level is brought down to the low level by coupling it to ground potential. In an alternative design, one output node of the flip-flop may be shifted to the high level by connecting it to a voltage source. FIG. 6 illustrate still another embodiment of the invention. The arbiter circuit 2 of FIG. 6 is essentially the same in configuration as the one shown in FIG. 3 except that a switching device 2k is inserted between the output node A and the voltage source Vcc. As the switching device 2k senses that nodes A and B have been brought to the midway potential, the switching device 2k is triggered into conduction to shift the potential on node A to the high level potential Vcc of the voltage source. As a consequence, only the $\overline{ACK}/$ signal is brought to the low level thereby to grant the request for access to the shared source made by means of the REQ-B signal.

A will be readily understood from the description of the preceding three embodiments, when the arbiter circuit senses that the two output nodes of the flip-flop have reached the midway potential level, it functions to positively couple one of the output nodes either to ground potential or to the source potential, which leads to the selection of one of the two competing requests for the shared resource made by both subsystems. This also effectively prevents an undesirable operating condition of both subsystems being denied access to the shared resource.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An arbiter circuit comprising:
SR flip-flop means operable to provide signals to its two outputs in response to first and second request signals externally supplied thereto, said first and second request signals shiftable between first and second logic levels;
sensing means to provide a sense output signal when said output signals from said two outputs of said flip-flop means reach simultaneously an intermediate level between said first and second logic levels;
driver means operable in response to said sense output signal form said sensing means to positively drive one of said two output signals from said flip-flop to one of said first and second logic levels; and
means for transferring said two output signals from said flip-flop means as first and second acknowledgement signals with a predetermined time delay, wherein
said SR flip-flop means comprises first and second gate means,
said first gate means is supplied with said first request signal and an output signal from said second gate means,
said second gate means is supplied with said second request signal and an output signal from said first gate mans,
said sensing means includes a third gate means supplied with the output signals from said first and second gate means and having a threshold level in the neighborhood of said intermediate level,
said driver means comprises a voltage source for providing one of said first and second logic levels, and switching means connected between one of said two outputs of said SR flip-flop means and said voltage source and having a control terminal coupled to the output of said third gate means.

2. An arbiter circuit according to claim 1, wherein said first logic level is ground potential and said second logic level is power supply potential.

3. An arbiter circuit according to claim 2, wherein said first and second gate means each comprises a two-input NAND gate, and said third gate means comprises a two-input NOR gate.

4. An arbiter circuit according to claim 2, wherein said first and second gate means each comprises a two-input NOR gate and said third gate means comprises a two-input NAND gate.

5. An arbiter circuit according to claim 1, wherein said predetermined delay time is longer than a period of time it takes to positively shift one of said two output signals at said intermediate level to said first logic level or said second logic level.

* * * * *